United States Patent
Tang et al.

(10) Patent No.: US 11,403,488 B2
(45) Date of Patent: Aug. 2, 2022

(54) APPARATUS AND METHOD FOR RECOGNIZING IMAGE-BASED CONTENT PRESENTED IN A STRUCTURED LAYOUT

(71) Applicant: Hong Kong Applied Science and Technology Research Institute Company Limited, Hong Kong (HK)

(72) Inventors: Wai Kai Arvin Tang, Hong Kong (HK); Jinning Yang, Shenzhen (CN)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 279 days.

(21) Appl. No.: 16/823,398

(22) Filed: Mar. 19, 2020

(65) Prior Publication Data
US 2021/0295101 A1   Sep. 23, 2021

(51) Int. Cl.
*G06V 30/414*   (2022.01)
*G06K 9/62*   (2022.01)
(Continued)

(52) U.S. Cl.
CPC ............ *G06K 9/6257* (2013.01); *G06N 3/08* (2013.01); *G06N 7/005* (2013.01);
(Continued)

(58) Field of Classification Search
CPC ..................... G06V 30/00–43; G06N 3/08
See application file for complete search history.

(56) References Cited

U.S. PATENT DOCUMENTS

| 7,305,612 | B2 | 12/2007 | Chakraborty |
| 10,331,949 | B2 | 6/2019 | Bellert |

(Continued)

FOREIGN PATENT DOCUMENTS

| CN | 1492377 A | 4/2004 |
| CN | 108416279 A | 8/2018 |

(Continued)

OTHER PUBLICATIONS

Qasim et al Rethinking Table Recognition using Graph Neural Networks 2019 International Conference on Document Analysis and Recognition (ICDAR) (Year: 2019).*
(Continued)

*Primary Examiner* — Sean T Motsinger
(74) *Attorney, Agent, or Firm* — Idea Intellectual Limited; Margaret A. Burke; Sam T. Yip (57) ABSTRACT

A method for extracting information from a table includes steps as follows. Characters of a table are extracted. The characters are merged into n-gram characters. The n-gram characters are merged into words and text lines through a two-stage GNN mode. The two-stage GNN mode comprises sub steps as: spatial features, semantic features, CNN image features are extracted from a target source; a first GNN stage is processed to output graph embedding spatial features from the spatial features; and a second GNN stage is processed to output graph embedding semantic features and graph embedding CNN image features from the semantic features and the CNN image features, respectively. The text lines are merged into cells. The cells are grouped into rows, columns, and key-value pairs based on one or more adjacency matrices, a row relationship among the cells, a column relationship among the cells, and a key-value relationship among the cells.

20 Claims, 6 Drawing Sheets

(51) Int. Cl.
  *G06N 3/08*     (2006.01)
  *G06N 7/00*     (2006.01)
  *G06V 30/196*   (2022.01)
  *G06V 30/412*   (2022.01)
  *G06V 30/10*    (2022.01)

(52) U.S. Cl.
  CPC ........ *G06V 30/1988* (2022.01); *G06V 30/412* (2022.01); *G06V 30/414* (2022.01); *G06V 30/10* (2022.01)

(56) References Cited

U.S. PATENT DOCUMENTS

| | | | |
|---|---|---|---|
| 2016/0117412 | A1 | 4/2016 | Mungi et al. |
| 2019/0108639 | A1 | 4/2019 | Tchapmi et al. |
| 2021/0192201 | A1* | 6/2021 | Nguyen ............... G06V 30/414 |
| 2021/0201182 | A1* | 7/2021 | Li ........................ G06N 3/0445 |
| 2021/0248367 | A1* | 8/2021 | Gal ...................... G06V 10/454 |
| 2021/0256052 | A1* | 8/2021 | Luo .................. G06V 30/18181 |
| 2021/0271872 | A1* | 9/2021 | Gupta ................. G06V 30/153 |
| 2021/0295101 | A1* | 9/2021 | Tang ................... G06N 3/0454 |
| 2021/0350125 | A1* | 11/2021 | Arvela ..................... G06N 3/08 |

FOREIGN PATENT DOCUMENTS

| | | |
|---|---|---|
| CN | 108446540 A | 8/2018 |
| CN | 110277165 A | 9/2019 |
| CN | 110705260 A | 1/2020 |
| CN | 110717049 A | 1/2020 |

OTHER PUBLICATIONS

Riba et al Table Detection in Invoice Documents by Graph Neural Networks IEEE (Year: 2019).*

International Search Report of corresponding PCT Patent Application No. PCT/CN2020/080694 dated Oct. 27, 2020.

Thomas G. Kieninger, "Table Structure Recognition Based on Robust Block Segmentation", German Research Center for Artificial Intelligence, Apr. 1, 1998.

Bernhard Krupl et. al., "Visually Guided Bottom-Up Table Detection and Segmentation in Web Documents", Jan. 2006.

Xiaojing Liu et. al., "Graph Convolution for Multimodal Information Extraction from Visually Rich Documents", Alibaba Group, Mar. 27, 2019.

Shah Rukh Qasim et. al., "Rethinking Table Recognition Using Graph Neural Networks", School of Electrical Engineering and Computer Science (SEECS), May 31, 2019.

* cited by examiner

| Item | Description | Price | Qty | Ext. Price |
|---|---|---|---|---|
| C30010 | Cotton On Top – New<br>Color: White Size: Large | $35.00 | 1 | $35.00 |
| D300080 | Dreamers Dress with Tie Front<br>Color: Black Size: Middle | $59.00 | 1 | $59.00 |

| Item | Description | Price | Qty | Ext.Price |
|---|---|---|---|---|
| C30010 | Cotton On Top – New Color: White Size: Large | $35.00 | 1 | $35.00 |
| D300080 | Dreamers Dress with Tie Front Color: Black Size: Middle | $59.00 | 1 | $59.00 |

FIG. 6A

| Item | Description | Price | Qty | Ext.Price |
|---|---|---|---|---|
| C30010 | Cotton On Top – New Color: White Size: Large | $35.00 | 1 | $35.00 |
| D300080 | Dreamers Dress with Tie Front Color: Black Size: Middle | $59.00 | 1 | $59.00 |

FIG. 6B

| Item | Description | Price | Qty | Ext.Price |
|---|---|---|---|---|
| C30010 | Cotton On Top – New Color: White Size: Large | $35.00 | 1 | $35.00 |
| D300080 | Dreamers Dress with Tie Front Color: Black Size: Middle | $59.00 | 1 | $59.00 |

FIG. 6C

APPARATUS AND METHOD FOR RECOGNIZING IMAGE-BASED CONTENT PRESENTED IN A STRUCTURED LAYOUT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of extracting information and table understanding. More specifically, the present invention relates to techniques of extracting information from structured textual data and constructing logic structures from structured textual data, within complex table layouts.

BACKGROUND OF THE INVENTION

Tables are convenient way to represent information in a structured format and are suitable for establishing and presenting relational data. Visually rich documents are very common in daily life. Examples include purchase receipts, insurance policy documents, and custom declaration forms and so on. In the documents, visual and layout information is critical for document understanding.

Table recognition is a technique for extracting meaningful information from tables in electronic and physical documents, such as financial documents, receipts, invoices, or quotation which can then be converted into editable data stored. Table segmentation can construct one-to-one corresponding relationships that may convert the table into machine-understandable knowledge. For example, by the table recognition, a document having a table format can be scanned, text-recognized, and converted into electronic data to be stored in a searchable database. This technology is important to expand table utilization, enabling users to rapidly and accurately search and extract key data from tables.

However, in some practical cases, table recognition is challenged in precise extraction when faced with a table layout that is complex, such as nested rows/columns or overlap rows/columns in the table. That is, existing table recognition technologies can recognize textual information in the tables but not the actual table structure. In general, table recognition for heterogeneous documents is challenging due to the wide variety of table layouts. Therefore, there is a need in the art for a high-accuracy approach for table recognition to extract information from various table layouts.

SUMMARY OF THE INVENTION

The present invention provides a method and an apparatus for extracting information from an image-based content presented in a structured layout. A structured layout is for texts to be distributed on a page of a document with certain arrangements, such as a table. In accordance with one aspect of the present invention, a method for extracting information from a table to process table recognition comprises the processing steps as follows. Characters of a table are extracted from an electronic or physical document by a character classifier. The characters with two-dimensional positions thereof are merged into n-gram characters by character classifier. The n-gram characters are merged into words and text lines by a multi-task graph neural network (GNN) with a two-stage GNN mode. The two-stage GNN mode execution comprises processing steps including: spatial features, semantic features, and convolution neural network (CNN) image features extraction from a target source; a first GNN stage to generate graph embedding spatial features from the extracted spatial features; and a second GNN stage to generate graph embedding semantic features and graph embedding CNN image features from the extracted semantic features and the extracted CNN image features, respectively. The results are that text lines are merged into cells; and the cells are grouped into rows, columns, and key-value pairs based on one or more adjacency matrices, and a row relationship among the cells, a column relationship among the cells, and a key-value relationship among the cells.

In one embodiment, the method further comprises: generating content of the table in a form of editable electronic data according to the adjacency matrices; and preserving the content of the table into extensible markup language (XML).

In accordance with another aspect of the present invention, an apparatus for extracting information from a table to process table recognition comprises a character classifier and a multi-task GNN. The character classifier, having an optical character reader (OCR) engine, is configured to extract one or more characters of a table from an electronic or physical document. The character classifier is configured to merge the characters with one or more two-dimensional positions thereof into n-gram characters. The multi-task GNN with a two-stage GNN mode is trained and configured to extract spatial features, semantic features, and convolution neural network (CNN) image features from a target source. In a first GNN stage, the GNN generates graph embedding spatial features from the extracted spatial features. In a second GNN stage, the GNN generates graph embedding semantic features and graph embedding CNN image features from the extracted semantic features and the extracted CNN image features, respectively. The GNN is further configured to: merge the text lines into cells; and group the cells into rows, columns, and key-value pairs based on one or more adjacency matrices, and a row relationship among the cells, a column relationship among the cells, and a key-value relationship among the cells.

The advantages of the present invention include: (1) In the two-stage GNN mode, the second GNN stage follows the first GNN stage, such that the semantic features integration is based on a first weight matrix for the semantic features and the CNN image features integration is based on a second weight matrix for the CNN image features. Semantic features integration and CNN image feature integration can be separated from each other, preventing them exerting any influence on each other. (2) The grouping the cells is executed based on the semantic features thereof. As such, when the table recognition is faced with a case of segmenting a table having complex layout, accuracy of the grouping of cells of the table can be maintained by employing the semantic features of the cells. (3) Multi-task GNN model can utilize the relevancy among different tasks to improve model accuracy rate and generalization ability. (4) Information is extracted from the table with correct reading order, and content of table can be extracted as the structured data and preserved in XML format, which will be advantageous to constructing indexes to help search and providing quantitative data.

BRIEF DESCRIPTION OF THE DRAWINGS

Embodiments of the invention are described in more detail hereinafter with reference to the drawings, in which.

DETAILED DESCRIPTION

In the following description, methods and apparatuses for extracting information from an image-based content in a structured layout, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides a method and an apparatus for image-based structured layout content recognition, which can convert structured layout information of an electronic or physical document into editable electronic data and then store the editable electronic data. A structured layout is for texts to be distributed on a page of a document with certain arrangements, such as a table. In accordance with one embodiment of the present invention, an image-based table content recognition method is executed by at least two logical components: a character classifier and a multi-task GNN. An ordinarily skilled person in the art may easily envision and realize the logical components by implementing in software, firmware, and/or machine instructions executable in one or more computer processors, specially configured processors, or combinations thereof.

In accordance with one embodiment, the character classifier is an image processing based character classifier for language character recognition. At design time, the character classifier is trained with a training data set containing characters of a selected language. For example, in the case where English is selected language, the training data set may contain characters A-Z and a-z. During training, images of different handwriting style/form or images of print writing with different fonts of each character of a useable number (e.g. 100 images per character) is fed to the character classifier, such that the training of the character classifier constructs a character feature database, so as to make the character classifier recognize the characters of the selected language. In various embodiments, the character classifier is constructed based on a neural network, such as convolutional neural network (CNN). In various embodiments, the character classifier also comprises using an OCR engine for performing conversion of images of typed, handwritten, or printed characters into machine codes. In still other embodiments, the number of process steps in the methods may be performed by one or more classifiers of various types and/or implementations made suitable to perform the tasks in the process steps.

In general, a GNN is a connectionist model that can capture the dependence of graphs via message passing between nodes of graphs and can update the hidden states of its nodes by a weighted sum of states of their neighborhood, so as to learn the distribution of large experimental data. Accordingly, GNNs are able to model a relationship between nodes in a graph and produce an embedding representation of it. One of the reasons for choosing the GNNs is that there are many readily available real-world data that can be represented in topological structures.

Figure 1:
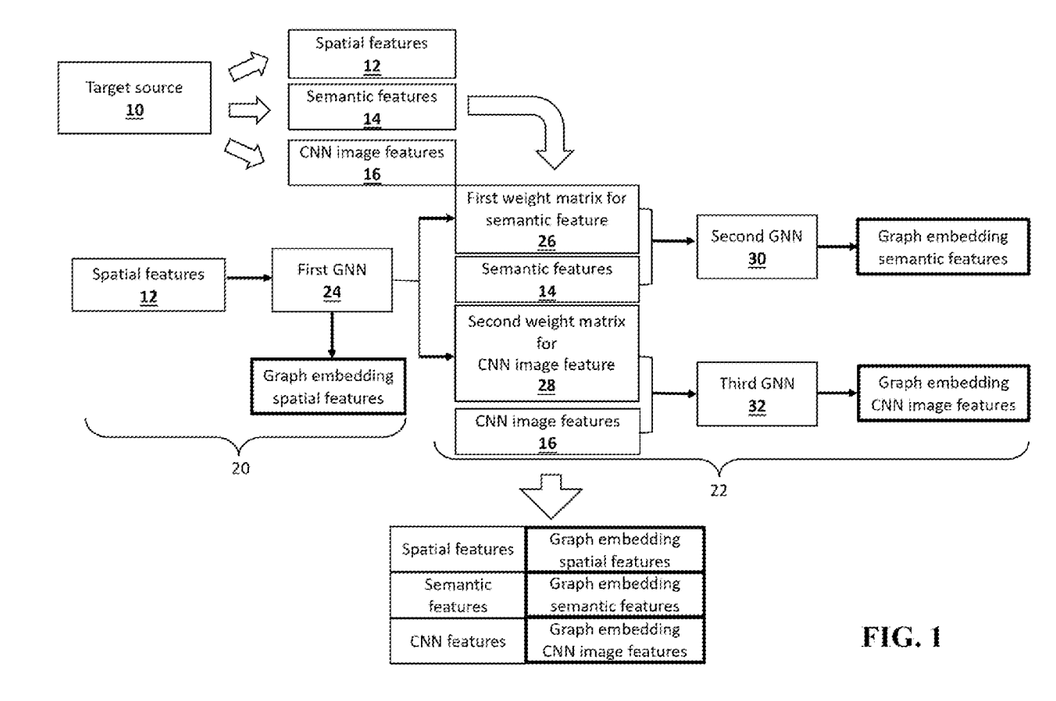
FIG. 1 depicts a simplified logical structural and dataflow diagram of processing target features in a two-stage GNN in accordance with various embodiments of the present invention.

FIG. 1 depicts a simplified logical structural and dataflow diagram of processing target features in the multi-task GNN. When inputting a target source 10 into a character classifier, corresponding features are extracted, wherein the target source 10 for the multi-task GNN may be an image of n-gram characters or an image of text lines. In some embodiments, the target source 10 is an image with a text box or other structured layout containing words, characters, phrases, n-gram characters, text lines, and/or combinations thereof. In one embodiment, the GNN includes a pretrained feature embedding layer configured to process the target source 10, so as to extract corresponding semantic features 12 containing word meanings. In one embodiment, a user interface is provided for manually predefining spatial features 14, and a CNN layer is connected to the GNN for extracting the corresponding CNN image features 16. Definitions of the spatial, semantic, and CNN image features 12, 14, and 16 in the present disclosure are listed as follows.

The spatial feature 12 represents geometric features of the text bounding box, such as coordinates, height, width, and height width ratio (a.k.a. aspect ratio); the semantic feature 14 represents n-gram character embedding, word embedding, or text line embedding from a pretrained embedding layer (e.g. millions of raw data and text documents); and the CNN image feature 16 represents CNN/image features of the mid-point of the text bounding box, which may contain information of font size, font type, and explicit separator.

In one embodiment, the GNN is separated into three sub networks: a first GNN 24, a second GNN 30, and a third GNN 32. In another embodiment, the GNN is configured differently at different processing step or stage such that the differently configured GNN are labeled: a first GNN 24, a second GNN 30, and a third GNN 32. In the first GNN stage 20, the spatial features 12 is input into the first GNN 24, such that graph embedding spatial features, a first weight matrix for the semantic features 26, and a second weight matrix for the CNN image features 28 can be output from the first GNN 24.

In the second GNN stage 22, processing the semantic and CNN image features 12 and 14 is in a parallel manner. That is, the semantic features 12 and the CNN image features 14 may be fed to different GNNs. As shown in FIG. 1, the semantic features 12 and the first weight matrix for the semantic features 26 are input into the second GNN 30, such the graph embedding semantic features are output from the second GNN. The CNN image features 24 and the second weight matrix for the CNN image features 28 are input into the third GNN 32, such the graph embedding CNN image features are output from the third GNN 32.

In the two-stage GNN mode, the second GNN stage 22 is executed after the generation of the first weight matrix for the semantic features 26 and the second weight matrix for the CNN image features 28. As such, the first weight matrix for the semantic features 26 and the second weight matrix for the CNN image features 28 can be separated out, thereby further processing the semantic and CNN image features 12 and 14 with prevention of them exerting any influence on each other.

After the second GNN stage 22, in addition to the spatial, semantic, and CNN image features 12, 14, and 16 obtained prior to the first and second GNN stages 20 and 22, the graph embedding spatial features, the graph embedding semantic features, and the graph embedding CNN image features are further obtained. More specifically, compared with sequential modeling, GNN can learn the importance among text blocks more flexibly and precisely. The degree of importance among text blocks is used to generate text block representation that incorporates the context. Briefly, by processing the spatial, semantic, and CNN image features 12, 14, and 16 in the two-stage GNN mode, these features 12, 14, and 16 can be integrated to output the respective graph embedding features, which will be advantageous to accurately recognize a table content.

Figure 2:
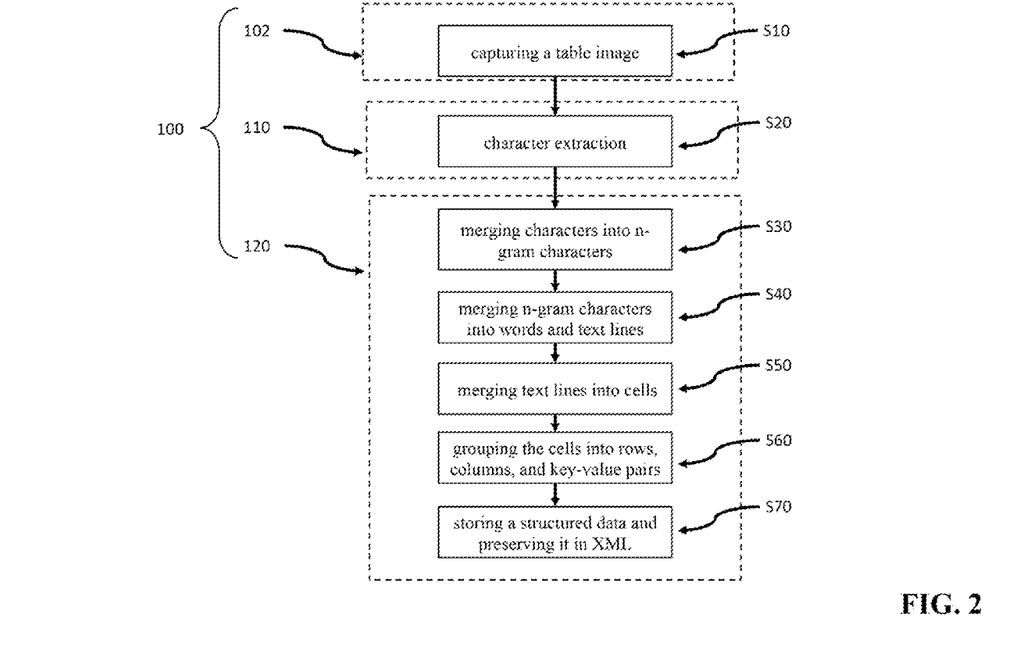
FIG. 2 depicts a simplified logical structural and dataflow diagram of a method for extracting logic structures from an image-based table content by a table-recognition system in accordance with various embodiments of the present invention.

The following further describes the workflow for the table content recognition. Referring to FIG. 2. In accordance with various embodiments of the present invention, the table-recognition system 100 includes a character classifier 110 and a GNN 120 configured to execute the process steps of the method described above. The method includes the processing steps S10, S20, S30, S40, S50, S60, and S70. S10 is the capturing of a table image; S20 is character extraction; S30 is the merging of characters into n-gram characters; S40 is the merging of n-gram characters into words and text lines; S50 is the merging of text lines into cells; S60 is the grouping of the cells into rows, columns, and key-value pairs; and S70 is the storing of a structured data. In various embodiments, S20 can be executed by the character classifier 110, and S30 to S70 can be executed by the GNN 120. In the present disclosure, the definition of a text line is that in each table cell, a text line is made up of a combination of words appearing on the same horizontal line; and the definition of a cell is the same as a table cell.

Figure 3:
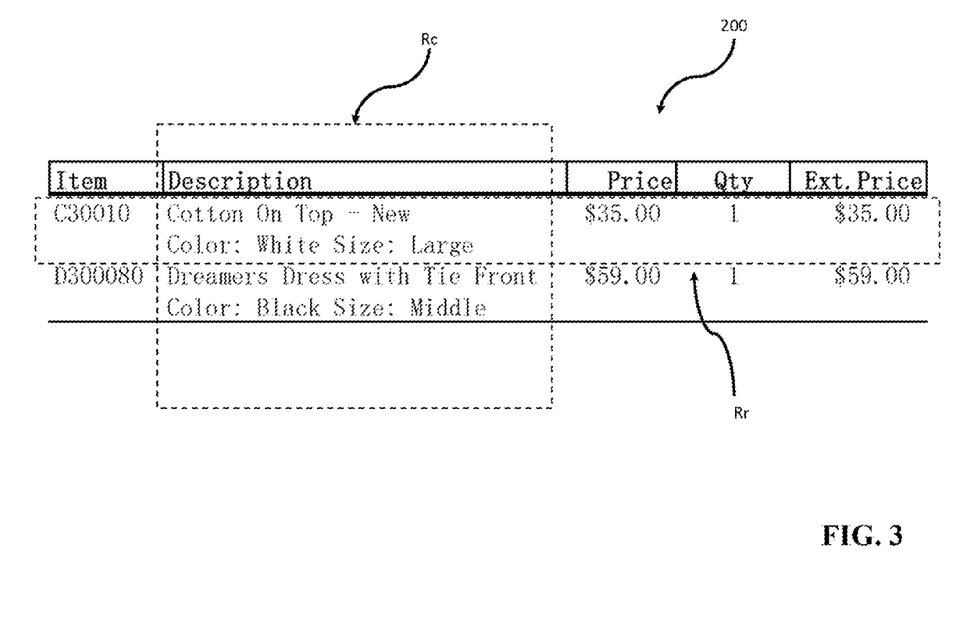
FIG. 3 depicts a table image representing a target table to be recognized.

In S10, an image of a table in an electronic or physical document is captured. In various embodiments, the table-recognition system 100 may further include an optical scanner 102 electrically coupled to the character classifier 110 and the GNN 120, so as to capture the image and transmit it to either the character classifier 110 or the GNN 120. To illustrate, a table image 200 shown in FIG. 3 is assumed as a target source to be recognized.

After capturing the table image, the method continues with S20. In S20, the image is transmitted to the character classifier 110 for character extraction. The character classifier 110 obtains the extracted information from characters in the table image 200. Specifically, the extracted information may include text, and coordination for each of the characters. In various embodiments, the character classifier 110 extracts information via OCR with a predetermining language. For example, an OCR engine for English can be selected. According to the exemplary table image 200 shown in FIG. 3, the feature extraction may at least include ["C", "o", "t", "t", "o", "n", "L", "a", "r", "g", "e"] and their coordinates.

After obtaining the extraction information, the method continues with S30. In S30, the extracted characters with their two-dimensional positions (i.e. the coordinates thereof) are merged into n-gram characters. For example, in response to the exemplary table image 200 shown in FIG. 3, the merging result for the n-gram characters may at least include ["Cot", "ott", "tto", "ton", "On", "Top", "-", "New" . . . ], or, ["Cott", "otto", "tton" . . . ], depending on the number of "n" for "n"-gram. In other embodiments, algorithms, such as Docstrum, Voronoi, and X-Y Cut are used to achieve the merging.

Figure 4:
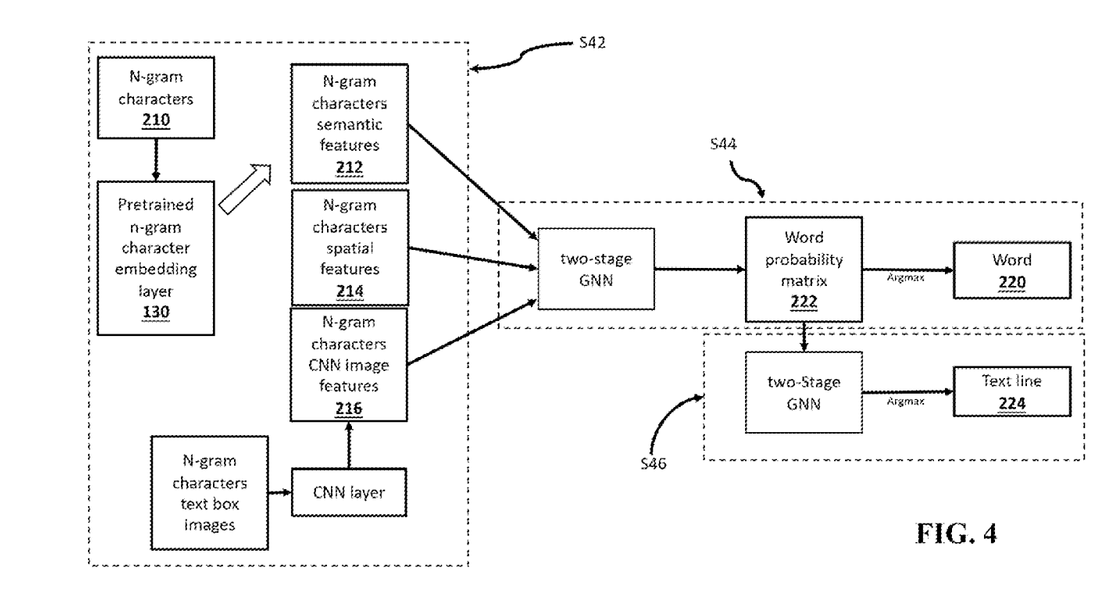
FIG. 4 depicts a simplified logical structural and dataflow diagram of merging n-gram characters into words and text lines.

Referring to FIGS. 2 and 4, after obtaining the n-gram characters, the method continues with S40 for merging the n-gram characters into words and text lines. The merging for the words and text lines includes multiple steps S42, S44, and S46. First, step S42 is executed to generate spatial features, semantic features, CNN image features with respect to the n-gram characters 210. The n-gram characters 210 are input into the pretrained n-gram character embedding layer 130 of the GNN 120, such that n-gram-characters semantic features 212 are generated and output from the pretrained n-gram character embedding layer 130. N-gram-characters spatial features 214 can be provided by manual predefinition. The GNN 120 may connect a CNN layer to process n-gram-characters text box images to generate and output n-gram-characters CNN image features 216 from the CNN layer.

In step S44, the n-gram-characters spatial features, semantic features, and CNN image features 212, 214, and 216 are processed by the GNN through a two-stage GNN mode, thereby integrating them into n-gram-characters graph embedding spatial features, semantic features, and CNN image features.

The graph embedding features are used to serve as merging materials to obtain words 220 of the table image. In response to the exemplary table image 200 shown in FIG. 3, the merging result to the words 220 may at least include ["Cotton", "On", "Top", "-", "New", "Color", ":", "White", "Size", ":", "Large"]. A word probability matrix 222 is generated by the GNN during the merging. In turn, a word adjacency matrix is the "argmax set" of the word probability matrix 222. The merging results of words 220 are obtained by finding the cliques of the word adjacency matrix for the n-gram characters, and that the n-gram characters in each clique being merged into "a word" (e.g. "Cotton"). More specifically, an argmax function is applied to the word probability matrix 222 to obtain the word adjacency matrix with values of 0's and 1's only. Then, the cliques are obtained from the word adjacency matrix, in which each of the cliques represents which n-gram characters belong to "a word".

Then, continuing with step S46, the n-gram characters 210 are merged into the text lines 224 by the GNN with the two-stage GNN mode. In one embodiment, a text line probability matrix (not shown in the figures) is introduced into the merging to serve as a weight matrix for obtaining the merging results of text lines 224. Similarly, an argmax function is applied to the text line probability matrix to obtain a text line adjacency matrix. Then, the cliques are obtained from the text line adjacency matrix, in which each of the cliques represents which n-gram characters belong to "a text line". In response to the exemplary table image 200 shown in FIG. 3, the merging result of the text lines 224 may at least include ["Cotton On Top New" and "Color: White Size: Large" . . . ].

Figure 5:
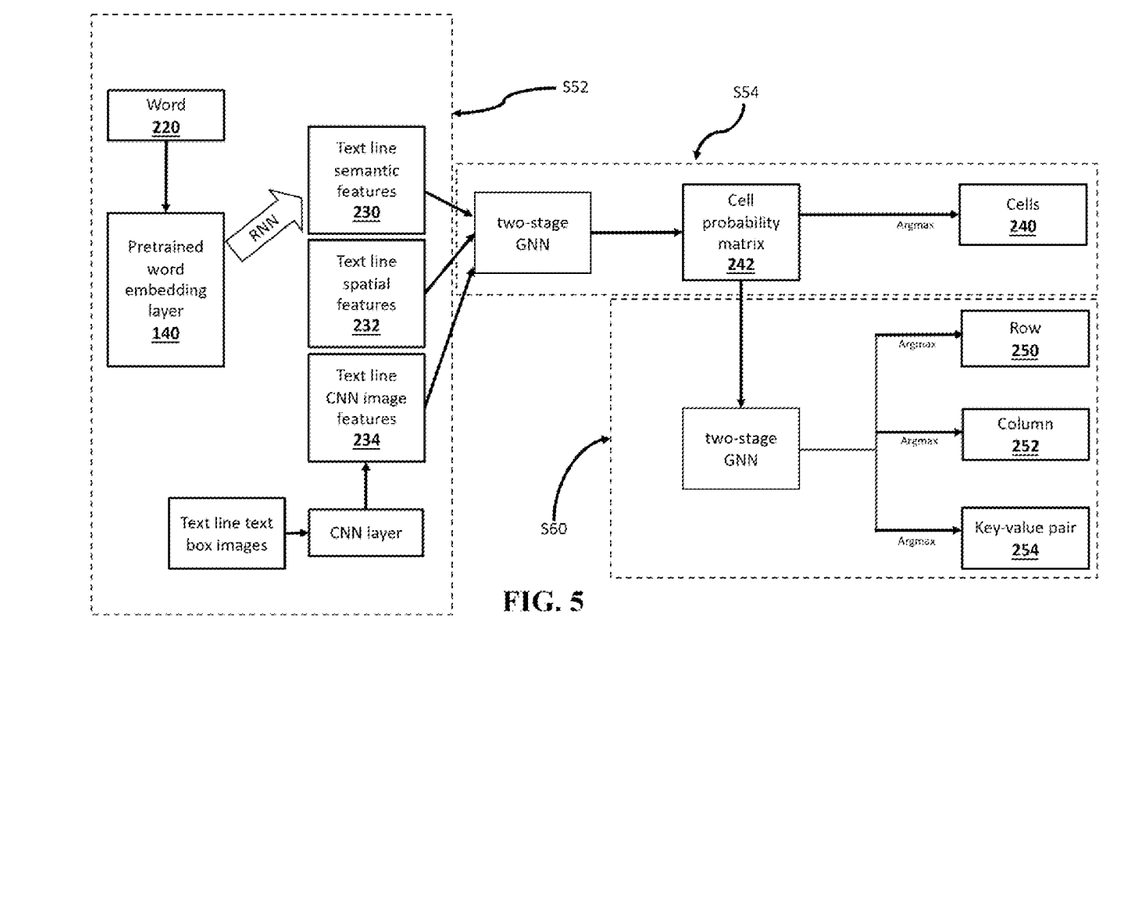
FIG. 5 depicts a simplified logical structural and dataflow diagram of merging text lines into cells and grouping the cells into rows, columns, and key-value pairs.

Referring to FIGS. 2 and 5. After obtaining the text lines, the method continues with S50 which is merging the text lines into cells. The merging for the cells includes steps S52 and S54. First, step S52 is executed to generate spatial features, a semantic features, CNN image features with respect to the text lines 224. Similar to above, a pretrained word embedding layer 140 of the GNN 120 processes the words 220 and the corresponding text lines 224 with connecting to a recurrent neural network (RNN), so as to generate and output text line semantic features 230. In various embodiments, the GNN 120 processes the words 220 only to generate and output the text line semantic features 230 via RNN. Text line spatial features 232 can be provided by manually predefining. The GNN 120 may connect to a CNN layer to process text line text box images to generate and output text line CNN image features 234 from the CNN layer.

In S54, the text line spatial features, semantic features, and CNN image features 230, 232, and 234 are processed by the GNN through a two-stage GNN mode, thereby integrating them into text line graph embedding spatial features, semantic features, and CNN image features. Herein, the two-stage GNN mode is the same as the descriptions to FIG. 1.

Next, these graph embedding features are used to serve as merging materials for the cells 240, wherein each "cell" has meaningful sets of characters and/or words and form elements of the table. In response to the exemplary table image 200 shown in FIG. 3, the merging result to the cells 240 may at least include ["Cotton On Top New Color: White Size: Large" . . . ]. In various embodiments, a cell probability matrix 242 is generated by the GNN during the merging. Similarly, a cell adjacency matrix is obtained as the "argmax set" of the cell probability matrix 242. Then to obtain the merging results of cells 240, cliques of the cell adjacency matrix are found, and the text lines in each clique are merged into "a cell".

Then, after obtaining the cells 240, the method continues with S60 for grouping the cells into rows, columns, and key-value pairs. As shown in FIG. 5, the rows 250, the columns 252, and the key-value pairs 254 are generated by the GNN through the two-stage GNN mode.

The grouping the cells 240 is executed based on the semantic features thereof. The reason for being based on the semantic features is that no matter how table layout changes, semantic is coherent within a cell, and semantic is similar within a column or row. As such, when the table recognition faces a case for segmenting a table having complex layout (e.g. nested row, nested column, overlap column, or irregular format), reducing accuracy of grouping cells of the table can be avoided by employing the semantic features of the text lines. Moreover, for the case of a table having a row span several columns or a column span several rows, considering the semantic features of the text lines can avoid low accuracy also.

In various embodiments, row, column, key-value pair probability matrices are introduced into the grouping to serve as weight matrices for obtaining the grouping results to the rows 250, the columns 252, and the key-value pairs 254, respectively. Similarly, adjacency matrices for the cells 240, and the rows 250, the columns 252, and the key-value pairs 254 are obtained as the "argmax sets" of the corresponding probability matrices respectively. To obtain the merging result to the rows 250, the columns 252, or the key-value pairs 254, cliques of the corresponding adjacency matrices are found, and the cells in each clique are merged into "a row", "a column", or "a key-value pair". Therefore, the results of the grouping the cells into rows, columns, and key-value pairs are represented by the adjacency matrices, and a row relationship among the cells, a column relationship among the cells, and a key-value relationship among the cells. In response to the exemplary table image 200 shown in FIG. 3, the grouping result for the rows 250 includes at least a region Rr, and the grouping result for the columns 252 includes at least a region Rc. Further, the grouping result for the key-value pairs 254 includes at least [Key: Item; Value: C30010, D30080] and [Key: Description; Value: Cotton On Top—New Color: White Size: Large, Dreamers Dress with Tie Front Color: Black Size: Middle].

Figure 6A:
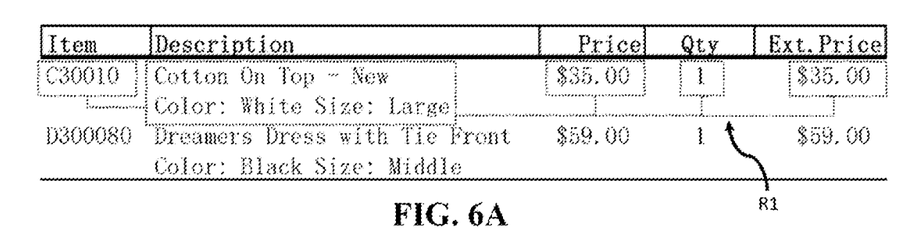
FIG. 6A shows the row relationships among the cells.
Figures 6B, 6C:
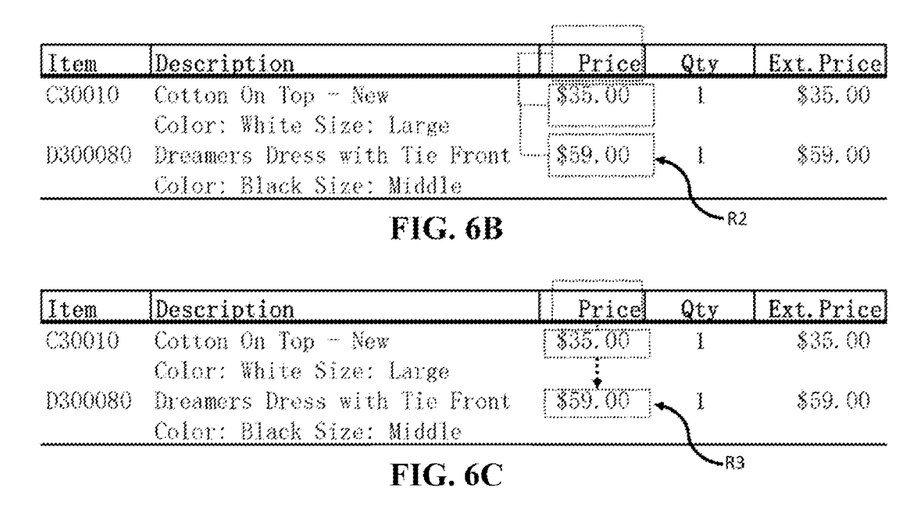
FIG. 6B shows the column relationships among the cells.
FIG. 6C shows the key-value relationships among the cells.

Thereafter, according to the obtained rows 250, columns 252, and key-value pairs 254, a row relationship among the cells, a column relationship among the cells, and a key-value relationship among the cells can be determined and obtained. To illustrate, FIGS. 6A, 6B, and 6C show the row, column, key-value relationships among cells, respectively, in which a first relationship R1 represents the row relationship, a second relationship R2 represents the column relationship, and a third relationship R3 represents the key-value relationship.

Referring to FIG. 2 again. After obtaining the row, column, key-value relationships among the cells, the method continues with S70 in which a table layout can be identified by the GNN 120, such that the GNN 120 can generate content of the table in a form of editable electronic data. Specifically, the statement "the table layout can be identified by the GNN 120" means the GNN 120 can extract the information from the table with correct reading order. As such, the generated content of the table may include at least one data set having a key and at least one value, in which the value matches the key. Herein, the phrase "the value can match the key" means the value is linked to the key based on the image features, semantic features, and/or spatial features. At the end of S70, by the afore-described features and adjacency matrices, the content of the table can be extracted as structured data and preserved in XML, which is advantageous in constructing search indexes and providing quantitative data.

The electronic embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for recognizing and extracting information from data presented in a structured layout in a target source document, comprising:
    providing a character classifier;
    providing a graph neural network (GNN) having a pretrained feature embedding layer and a two-stage GNN mode;
    extracting text characters in the structured layout in the target source document by the character classifier;
    merging the text characters with two-dimensional positions thereof into n-gram characters by the character classifier;
    extracting semantic features from the target source document by the pretrained feature embedding layer of the GNN, wherein the semantic features comprise word meanings;
    manually defining spatial features of the target source document, wherein the spatial features comprising geometric features of text bounding boxes such as coordinates, heights, widths, and aspect ratios in the document;
    using a convolution neural network (CNN) layer to obtain CNN image features of the target source document, wherein the CNN image features represent features of mid-point of a text box of the document and comprises one or more of font sizes and font types of the text characters, and explicit separators in the text of the document;
    merging the n-gram characters into words and text lines by the GNN;
    wherein the two-stage GNN mode having a first GNN stage and a second GNN stage;
    wherein the first GNN stage comprises:
        generating graph embedding spatial features from the spatial features;
    wherein the second GNN stage comprises:
        generating graph embedding semantic features and graph embedding CNN image features from the semantic features and the CNN image features, respectively;
    merging the text lines into cells by the GNN;
    grouping the cells into rows, columns, and key-value pairs by the GNN, wherein results of the grouping being represented by one or more adjacency matrices, and a row relationship among the cells, a column relationship among the cells, and a key-value relationship among the cells.

2. The method of claim 1, further comprising:
    generating content of a table in a form of editable electronic data according to the row relationship among the cells, the column relationship among the cells, and the key-value relationship among the cells.

3. The method of claim 2, wherein the content of the table includes at least one data set having a key and at least one value that matches the key.

4. The method of claim 2, further comprising preserving the content of the table into extensible markup language (XML).

5. The method of claim 1, wherein the first GNN stage further comprises: generating from the spatial features by a first GNN a first weight matrix for the semantic features and a second weight matrix for the CNN image.

6. The method of claim 5, wherein the second GNN stage further comprises:
    generating the graph embedding semantic features from the semantic features and the first weight matrix for the semantic features by a second GNN configured by the first weight matrix; and
    generating the graph embedding CNN image features from the CNN image features and the second weight matrix for the CNN image features by a third GNN configured by the second weight matrix.

7. The method of claim 1,
    wherein the merging of the n-gram characters into the words and the text lines comprises:
        generating a word probability matrix during the merging of the n-gram characters into the words; and
        introducing the word probability matrix during the merging of the words into the text lines, wherein the word probability matrix serves as a weight matrix to the GNN; and
    wherein the one or more adjacency matrices comprise a word adjacency matrix obtained by applying an argmax function to the word probability matrix.

8. The method of claim 1,
    wherein the merging of the text lines into the cells comprises generating a cell probability matrix;
    wherein the grouping of the cells into the rows, the columns, and the key-value pairs comprises: introducing the cell probability matrix into the grouping to serve as a weight matrix to the GNN; and
    wherein the one or more adjacency matrices comprise a cell adjacency matrix obtained by applying an argmax function to the cell probability matrix.

9. The method of claim 1, further comprising:
    capturing an image of the structured layout by using an optical scanner, wherein the text characters are extracted from the image by the character classifier.

10. The method of claim 1, wherein the merging of the text characters with two-dimensional positions thereof into n-gram characters by the character classifier uses one of Docstrum algorithm, Voronoi algorithm, and X-Y Cut algorithm.

11. An apparatus for recognizing and extracting information from data presented in a structured layout, comprising:
    a character classifier implemented by one or more processors configured to:
        extract text characters in the structured layout in a target source document;
        merge the text characters with two-dimensional positions thereof into n-gram characters;

a convolution neural network (CNN) layer implemented by the one or more processors further configured to obtain CNN image features of the target source document, wherein the CNN image features represent features of mid-point of a text box of the document and comprises one or more of font sizes and font types of the text characters, and explicit separators in the text of the document; and a graph neural network (GNN) implemented by the one or more processors further; wherein the GNN having a two-stage GNN mode;

wherein the two-stage GNN mode having a pretrained feature embedding layer and a first GNN stage and a second GNN stage;

wherein the pretrained feature embedding layer is configured to extract semantic features from the target source document, wherein the semantic features comprise word meanings;

wherein the first GNN stage comprises:
generating graph embedding spatial features from spatial features of the target source document, the spatial features being manually defined and comprising geometric feature of text bounding boxes such as coordinates, heights, widths, and aspect ratios in the target source document;

wherein the second GNN stage comprises:
generating graph embedding semantic features and graph embedding CNN image features from the semantic features and the CNN image features, respectively;

wherein the GNN is configured to:
merge the n-gram characters into words and text lines;
merge the text lines into cells by the GNN;
group the cells into rows, columns, and key-value, wherein results of the grouping being represented by one or more adjacency matrices, and a row relationship among the cells, a column relationship among the cells, and a key-value relationship among the cells.

12. The apparatus of claim 11, wherein the GNN is further configured to generate content of a table in a form of editable electronic data according to the adjacency matrices.

13. The apparatus of claim 12, wherein the content of the table includes at least one data set having a key and at least one value that matches the key.

14. The apparatus of claim 12, wherein the one or more processors are further configured to store the content of the table into extensible markup language (XML).

15. The apparatus of claim 11, wherein the first GNN stage further comprises:
generating from the spatial features by a first GNN a first weight matrix for the semantic features and a second weight matrix for the CNN image.

16. The apparatus of claim 15, wherein the second GNN stage further comprises:
generating the graph embedding semantic features from the semantic features and the first weight matrix for the semantic features by a second GNN configured by the first weight matrix; and
generating the graph embedding CNN image features from the CNN image features and the second weight matrix for the CNN image features by a third GNN configured by the second weight matrix.

17. The apparatus of claim 11,
wherein the merging of the n-gram characters into the words and the text lines comprises:
generating a word probability matrix during the merging of the n-gram characters into the words; and
introducing the word probability matrix during the merging of the words into the text lines, wherein the word probability matrix serves as a weight matrix to the GNN; and
wherein the one or more adjacency matrices comprise a word adjacency matrix obtained by applying an argmax function to the word probability matrix.

18. The apparatus of claim 11,
wherein the merging of the text lines into the cells comprises generating a cell probability matrix;
wherein the grouping of the cells into the rows, the columns, and the key-value pairs comprises: introducing the cell probability matrix into the grouping to serve as a weight matrix to the GNN; and
wherein the one or more adjacency matrices comprise a cell adjacency matrix obtained by applying an argmax function to the cell probability matrix.

19. The apparatus of claim 11, further comprising an optical scanner, wherein the text characters are extracted from the image by the character classifier.

20. The apparatus of claim 11, wherein the character classifier is further configured to merge the text characters with two-dimensional positions thereof into n-gram characters using one of Docstrum algorithm, Voronoi algorithm, and X-Y Cut algorithm.

* * * * *